(12) United States Patent
Okayasu

(10) Patent No.: US 10,510,059 B2
(45) Date of Patent: Dec. 17, 2019

(54) PRINTER DEVICE

(71) Applicant: Seiko Instruments Inc., Chiba-shi, Chiba (JP)

(72) Inventor: Takanori Okayasu, Chiba (JP)

(73) Assignee: SEIKO INSTRUMENTS INC., Chiba-Shi (JP)

(*) Notice: Subject to any disclaimer, the term of this patent is extended or adjusted under 35 U.S.C. 154(b) by 0 days.

(21) Appl. No.: 16/218,788

(22) Filed: Dec. 13, 2018

(65) Prior Publication Data

US 2019/0188674 A1    Jun. 20, 2019

(30) Foreign Application Priority Data

Dec. 14, 2017    (JP) ................. 2017-239440

(51) Int. Cl.
*G06F 3/12* (2006.01)
*G06Q 20/20* (2012.01)
(Continued)

(52) U.S. Cl.
CPC ......... *G06Q 20/209* (2013.01); *G06F 3/1237* (2013.01); *G07G 5/00* (2013.01); *G07G 1/14* (2013.01)

(58) Field of Classification Search
None
See application file for complete search history.

(56) References Cited

U.S. PATENT DOCUMENTS 8,459,542 B2 * 6/2013 Koakutsu ........... G06Q 10/0832
235/375
8,887,992 B2 * 11/2014 Koakutsu ........... G06Q 10/0832
235/375
(Continued)

FOREIGN PATENT DOCUMENTS

EP    1 580 704 A2    9/2005
EP    1580704 A2 *  9/2005 ............. G06Q 20/20
(Continued)

OTHER PUBLICATIONS

Extended European Search Report dated May 13, 2019, 8 pages.

*Primary Examiner* — Ted W Barnes
(74) *Attorney, Agent, or Firm* — Brinks Gilson & Lione

(57) ABSTRACT

A printer device includes: a receiver configured to receive pieces of information from a host device; a storage configured to store output information among the pieces of information received by the receiver; a printer configured to print information on a sheet based on printing information; a display communication device configured to transmit display information to a display device; an output destination selection module configured to select an output destination of the output information stored in the storage based on instruction information among the pieces of information received by the receiver from the host device; a display information generation module configured to generate, when the output destination selected by the output destination selection module is the display device, the display information based on the output information stored in the storage; a display communication device configured to output the display information generated by the display information generation module to the display device; and a printing controller configured to output, when the output destination selected by the output destination selection module is the printer, the printing information that is based on the output information stored in the storage, to the printer, wherein the display communication device configured to output the display information generated by the display information generation module to the display device.

8 Claims, 11 Drawing Sheets

(51) Int. Cl.
*G07G 5/00* (2006.01)
*G07G 1/14* (2006.01)

(56) References Cited

U.S. PATENT DOCUMENTS

2007/0069013 A1* 3/2007 Seifert ............... G06O 20/0453
235/383
2014/0307271 A1* 10/2014 Suzuki ............... G06Q 20/0453
358/1.6

FOREIGN PATENT DOCUMENTS

| EP | 3 236 404 A1 | 10/2017 | |
|----|---|---|---|
| EP | 3236404 A1 * | 10/2017 | ........... G07F 19/201 |
| JP | 2002318682 A * | 10/2002 | |
| JP | 2014-195877 A | 10/2014 | |
| WO | WO-2008040971 A1 * | 4/2008 | ............. G06Q 30/02 |

* cited by examiner

FIG.3

PT-CD ASSOCIATION TABLE TBL

| COMMAND | TEMPLATE NUMBER | Data |
|---|---|---|
| COMMAND CODE 1 | 1 | #ID1, #ID2, #ID3 |
| COMMAND CODE 2 | 2 | #IMG2 |
| | | |

FIG.4

| #FIMG | FIXED IMAGE DATA (FIMG) |
|---|---|
| 1 | COMPANY LOGO DATA |
| | |
| | |
| | |

FIG.5

| #IMG | IMAGE DATA (IMG) |
|---|---|
| 1 | PRODUCT A IMAGE DATA |
| 2 | PRODUCT B IMAGE DATA |
|  |  |

FIG.6

| #ID | TEXT DATA (TXT) |
|---|---|
| 1 | "900 YEN" |
| 2 | "1,000 YEN" |
| 3 | "100 YEN" |
|  |  |

FIG.10

```
Template (var_1, var_2, var_3) {
#Char1:<area0,0-480,272>
    <font-family:fontB; font-size:2x>"TOTAL AMOUNT"<align:right; font-family:fontA; font-size:2x>var_1<LF>
    <font-family:fontB; font-size:2x>"RECEIVED"<align:right; font-family:fontA; font-size:2x>var_2<LF>
    <font-family:fontB; font-size:2x>"CHANGE"<align:right; font-family:fontA; font-size:2x>var_3<LF>
}
```

```
Template (img_1, var_1) {
  #Image1:<area:0,0-240,272>
    <align_center>img_1
  #Char1 :<area:241,0-480,272>
    <font-family:fontA>"* ERROR: OUT OF PAPER"<LF>
    <font-family:fontA>" PLEASE SET SHEETS AS SHOWN IN THE IMAGE"<LF>
    <font-family:fontA; color:red>"*) TO PURCHASE SHEETS:"<LF>
    <font-family:fontA; color:red>var_1<LF>
}
```

PRINTER DEVICE

RELATED APPLICATIONS

This application claims priority under 35 U.S.C. § 119 to Japanese Patent Application No. 2017-239440 filed on Dec. 14, 2017, the entire content of which is hereby incorporated by reference.

BACKGROUND OF THE INVENTION

1. Field of the Invention

The present invention relates to a printer device.

2. Description of the Related Art

Hitherto, there has been known a POS system including a printer device and a display device.

The related-art POS system is configured such that a processor of a POS terminal is configured to control the printer device and the display device independently of each other. In the POS system, details to be printed by the printer device and details to be displayed by the display device may have common parts such as the name and price of a product at the time of purchase thereof.

However, in the related-art POS system, the processor of the POS terminal controls the printer device and the display device independently of each other, and thus, even when the details to be output have common parts, the processor outputs information to the printer device and the display device independently of each other. As a result, the processing efficiency of the processor of the POS terminal deteriorates in some cases. Thus, there is a problem in that the related-art POS system causes deterioration of the efficiency of payment processing by the POS terminal.

In view of the above, in the field of this kind, there has been a demand for a printer device capable of improving the efficiency of payment processing by the POS terminal.

SUMMARY OF THE INVENTION

According to one embodiment of the present invention, there is provided a printer device, including: a receiver configured to receive pieces of information from a host device; a storage configured to store output information among the pieces of information received by the receiver; a printer configured to print information on a sheet based on printing information; a display communication device configured to transmit display information to a display device; an output destination selection module configured to select an output destination of the output information stored in the storage based on instruction information among the pieces of information received by the receiver from the host device; a display information generation module configured to generate, when the output destination selected by the output destination selection module is the display device, the display information based on the output information stored in the storage; a display communication device configured to output the display information generated by the display information generation module to the display device; and a printing controller configured to output, when the output destination selected by the output destination selection module is the printer, the printing information that is based on the output information stored in the storage, to the printer, wherein the display communication device configured to output the display information generated by the display information generation module to the display device.

In the above-mentioned printer device according to the one embodiment of the present invention, wherein the storage is configured to store an association table, which associates a type of the instruction information with a type of the display information, and wherein the display information generation module is configured to generate the display information by converting the instruction information to the display information based on the association table stored in the storage.

In the above-mentioned printer device according to the one embodiment of the present invention, wherein the information received by the receiver contains image data.

In the above-mentioned printer device according to the one embodiment of the present invention, further including a non-volatile storage configured to hold information stored therein irrespective of whether power is supplied to the non-volatile storage, wherein the printing controller is configured to generate the printing information based on the output information stored in the storage and the information stored in the non-volatile storage.

In the above-mentioned printer device according to the one embodiment of the present invention, further including a detector configured to perform one of detecting a printing instruction to be received by the display communication device from the display device and detecting a printing instruction operation for an operation device included in the own printer device, wherein the printing controller is configured to determine whether to output the printing information to the printer based on a result of detection by the detector.

BRIEF DESCRIPTION OF THE DRAWINGS

FIG. 3 is a table for showing an example of a PT-CD association table in the first embodiment.

FIG. 4 is a table for showing an example of fixed image data in the first embodiment.

FIG. 5 is a table for showing an example of image data in the first embodiment.

FIG. 6 is a table for showing an example of text data in the first embodiment.

FIG. 10 is a diagram for illustrating an example of a template to be stored in a display device storage in the first embodiment.

DETAILED DESCRIPTION OF THE PREFERRED EMBODIMENTS

First Embodiment

Figure 1:
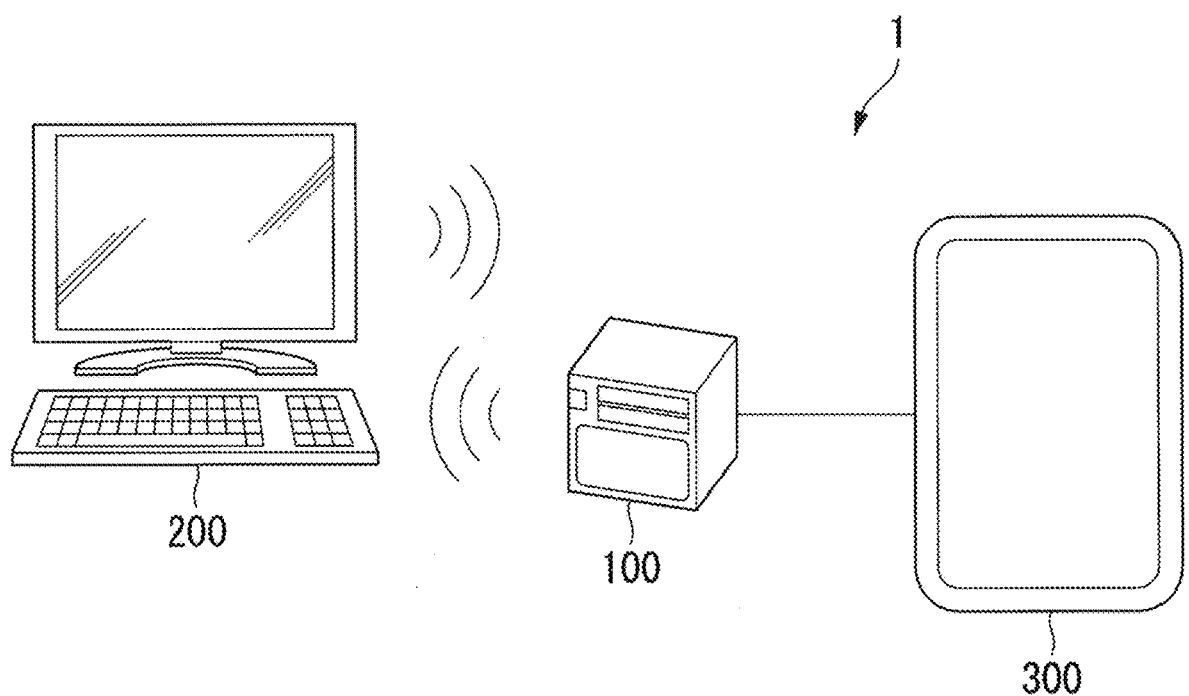
FIG. 1 is a diagram for illustrating an example of a configuration of a POS system in a first embodiment of the present invention.

In the following, a description is given of embodiments of the present invention with reference to the drawings. FIG. 1 is a diagram for illustrating an example of a configuration of a POS system 1 in a first embodiment of the present invention. The POS system 1 includes a printer device 100, a POS terminal 200, and a display device 300.

The POS terminal 200 receives an operation of reading product information from, for example, a barcode attached to a product, and an operation of printing, for example, a receipt or a discount coupon. The POS terminal 200 transmits a printing instruction that depends on the received operation to the printer device 100. Further, the POS terminal 200 transmits a display instruction that depends on the received operation to the display device 300 via the printer device 100. As an example, when the POS terminal 200 receives an operation of issuing a receipt, the POS terminal 200 transmits a printing start command for instructing issuing of a receipt and data on the name and price of a product to be printed on the receipt to the printer device 100. Further, the POS terminal 200 transmits to the printer device 100 a display command for displaying details (name and price of product in this case) to be printed on the receipt on the display device 300.

The printer device 100 is connected to the POS terminal 200. For example, the printer device 100 is connected to the POS terminal 200 by short-range communication, for example, Bluetooth (trademark). In this example, the printer device 100 is a thermal printer configured to print data line by line based on control by the POS terminal 200.

The display device 300 is connected to the printer device 100. In this example, the display device 300 is connected to the printer device 100 by wired communication such as Universal Serial Bus (USB) or Recommended Standard 232 version C (RS-232C). The display device 300 includes, for example, a liquid crystal display, and displays an image based on a display command DC transmitted from the printer device 100. In this example, the display device 300 is a so-called customer display, and displays, for example, a total amount, received amount, and change amount at the time of purchase of a product.

Figure 2:
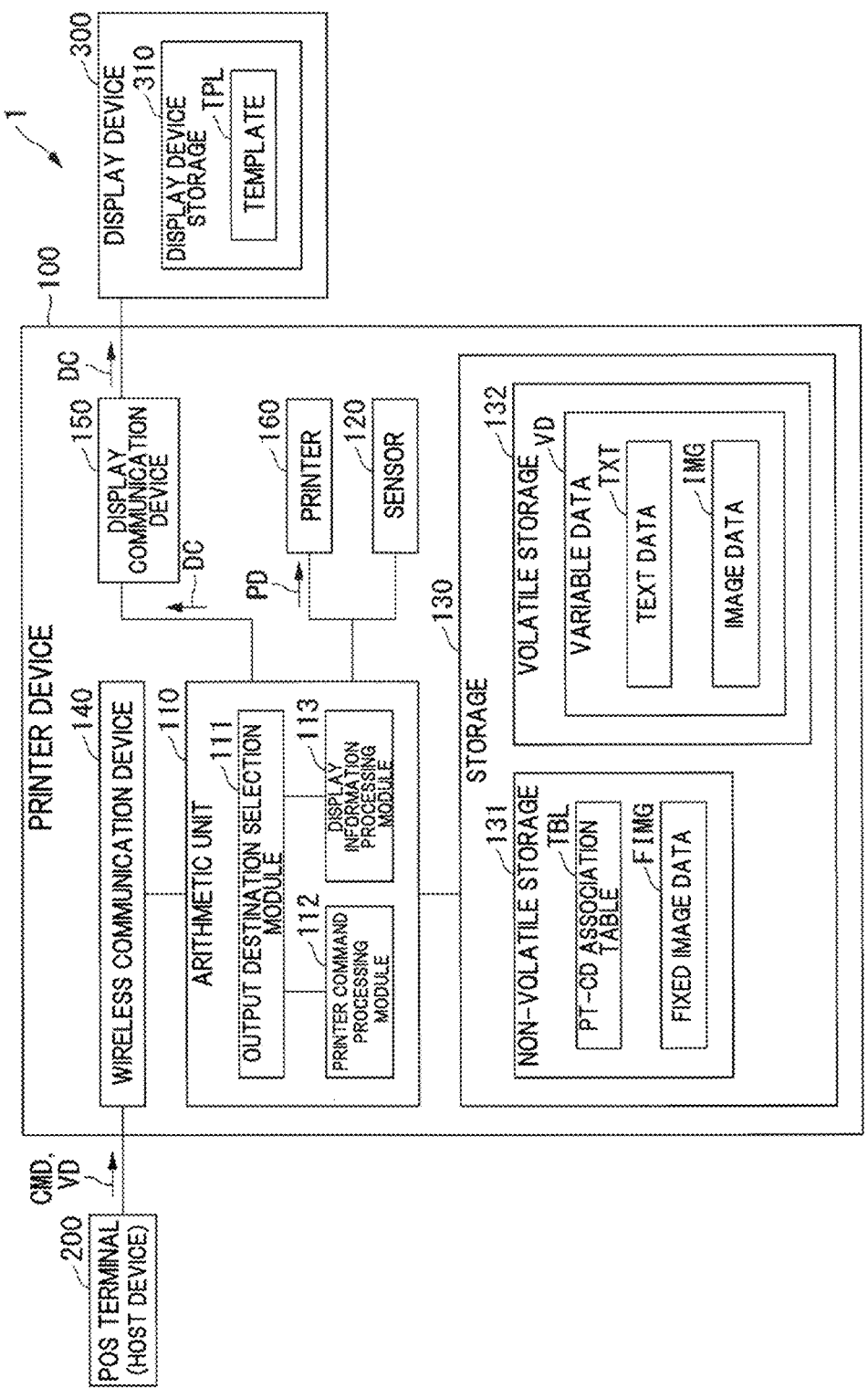
FIG. 2 is a diagram for illustrating an exemplary functional configuration of the POS system in the first embodiment.

FIG. 2 is a diagram for illustrating an exemplary functional configuration of the POS system 1 in the first embodiment. The printer device 100 includes an arithmetic unit 110, a sensor 120, a storage 130, a wireless communication device 140, a display communication device 150, and a printer 160.

The wireless communication device 140 is configured to perform wireless communication to/from the POS terminal 200. The POS terminal 200 is an example of a host device of the printer device 100. As an example, the POS terminal 200 transmits a command CMD and variable data VD to the printer device 100. The wireless communication device 140 receives the command CMD and the variable data VD transmitted by the POS terminal 200. The wireless communication device 140 includes a reception buffer (not shown), and causes the reception buffer to store the received command CMD and variable data VD.

This variable data VD contains text data TXT and image data IMG. The text data TXT is a character string indicating, for example, the name and price of a product, and is data that can be represented by, for example, a character code. Further, the image data IMG is image data representing, for example, an appearance of a product, and is data that can be represented by, for example, bitmap. In general, the image data IMG contains more information than the text data TXT. As a result, the image data IMG requires a larger amount of time for transmission from the POS terminal 200 to the wireless communication device 140 compared to the text data TXT.

The storage 130 stores various kinds of information. Specifically, the storage 130 includes a non-volatile storage 131 and a volatile storage 132. The non-volatile storage 131 includes, for example, a flash read-only memory (ROM). The non-volatile storage 131 holds information stored therein irrespective of whether power is supplied thereto. As an example of the first embodiment, the non-volatile storage 131 stores a PT-CD association table TBL and fixed image data FIMG. The volatile storage 132 includes, for example, a random access memory (RAM). The volatile storage 132 is easier to rewrite compared to the non-volatile storage 131, and further, it is more preferred that the number of times of rewrite be less restricted compared to the non-volatile storage 131. The volatile storage 132 stores the variable data VD received from the POS terminal 200 among pieces of information received from the POS terminal 200 by the wireless communication device 140. As described above, this variable data VD contains the text data TXT and the image data IMG.

Now, a description is given of a specific example of information to be stored in the non-volatile storage 131 and the volatile storage 132 with reference to FIG. 3 to FIG. 6. FIG. 3 is a table for showing an example of the PT-CD association table TBL in the first embodiment. The type (command code) of the command CMD to be transmitted by the POS terminal 200 and the type of data corresponding to the type of the command CMD are associated with each other in the PT-CD association table TBL. Further, the type of the template TPL may be associated in the PT-CD association table TBL. As an example, a command CMD with a command code 1, a template TPL with a template number 1, and pieces of variable data VD with #ID 1 to #ID 3 are associated with one another in the PT-CD association table TBL. Further, a command CMD with a command code 2, a template TPL with a template number 2, and a fixed image data FIMG with #IMG 2 are associated with one another in the PT-CD association table TBL.

FIG. 4 is a table for showing an example of the fixed image data FIMG in the first embodiment. The fixed image data FIMG is stored in the non-volatile storage 131 in association with an identifier #FIMG. The identifier #FIMG is an identifier for individually identifying the fixed image data FIMG. Specifically, #FIMG 1 and "company logo data" are associated with each other in the non-volatile storage 131.

FIG. 5 is a table for showing an example of the image data IMG in the first embodiment. The image data IMG is stored in the volatile storage 132 in association with an identifier #IMG. The identifier #IMG is an identifier for individually identifying the image data IMG. Specifically, #IMG 1 is associated with "product A image data" and #IMG 2 is associated with "product B image data" in the volatile storage 132.

FIG. 6 is a table for showing an example of the text data TXT in the first embodiment. The text data TXT is stored in the volatile storage 132 in association with the identifier #ID. The identifier #ID is an identifier for individually identifying the text data TXT. Specifically, #ID 1 is associated with "900 yen", #ID 2 is associated with "1,000 yen", and #ID 3 is associated with "100 yen" in the volatile storage 132.

Referring back to FIG. 2, the printer 160 includes, for example, a thermal head (not shown), a recording sheet supply mechanism, and a recording sheet cutting mechanism. The printer 160 prints information on a sheet, for example, a heat-sensitive recording sheet, based on control by the arithmetic unit 110. Specifically, the printer 160 prints information on a heat-sensitive recording sheet based on printing data PD output by the arithmetic unit 110. This printing data PD contains the fixed image data FIMG, the image data IMG, and the text data TXT described above. The sensor 120 detects the state of each component of the printer 160. This sensor 120 is a general term for various kinds of sensors included in the printer device 100. For example, the sensor 120 in the first embodiment detects whether there is a recording sheet. The sensor 120 outputs the result of detection of whether there is a recording sheet to the arithmetic unit 110.

The arithmetic unit 110 includes a central processing unit (CPU), and controls each component of the printer device 100. The arithmetic unit 110 includes an output destination selection module 111, a printer command processing module 112, and a display information processing module 113 as software functional modules.

The output destination selection module 111 reads the variable data VD stored in the volatile storage 132 based on the command CMD received from the POS terminal 200. Further, the output destination selection module 111 selects the output destination of the read variable data VD from any one of the printer 160 and the display device 300 based on the received command CMD.

The printer command processing module 112 processes the command CMD relating to printing by the printer 160 among the various kinds of commands CMD received from the POS terminal 200. In the following description, the command CMD relating to printing by the printer 160 among the commands CMD received from the POS terminal 200 is also referred to as "command for printer". As an example, when the output destination selected by the output destination selection module 111 is the printer 160, the printer command processing module 112 generates the printing data PD based on the fixed image data FIMG and the variable data VD stored in the storage 130. The printer command processing module 112 outputs the generated printing data PD to the printer 160.

The display information processing module 113 processes the command CMD relating to display by the display device 300 among the various kinds of commands CMD received from the POS terminal 200. In the following description, the command CMD relating to display by the display device 300 among the commands CMD received from the POS terminal 200 is also described as "command for display device". As an example, when the output destination selected by the output destination selection module 111 is the display device 300, the display information processing module 113 generates the display command DC based on the fixed image data FIMG and the variable data VD stored in the storage 130. The display information processing module 113 outputs the generated display command DC to the display communication device 150.

The display communication device 150 communicates to/from the display device 300 in a wired manner. As an example, the display communication device 150 outputs the display command DC generated by the display information processing module 113 to the display device 300.

The display device 300 displays information based on the display command DC output by the display communication device 150. The display device 300 may include a display device storage 310. The display device storage 310 stores the template TPL. In the following, a description is given taking an exemplary case of the printer device 100 using the template TPL stored in the display device storage 310 to display information on the display device 300.

Figure 7:
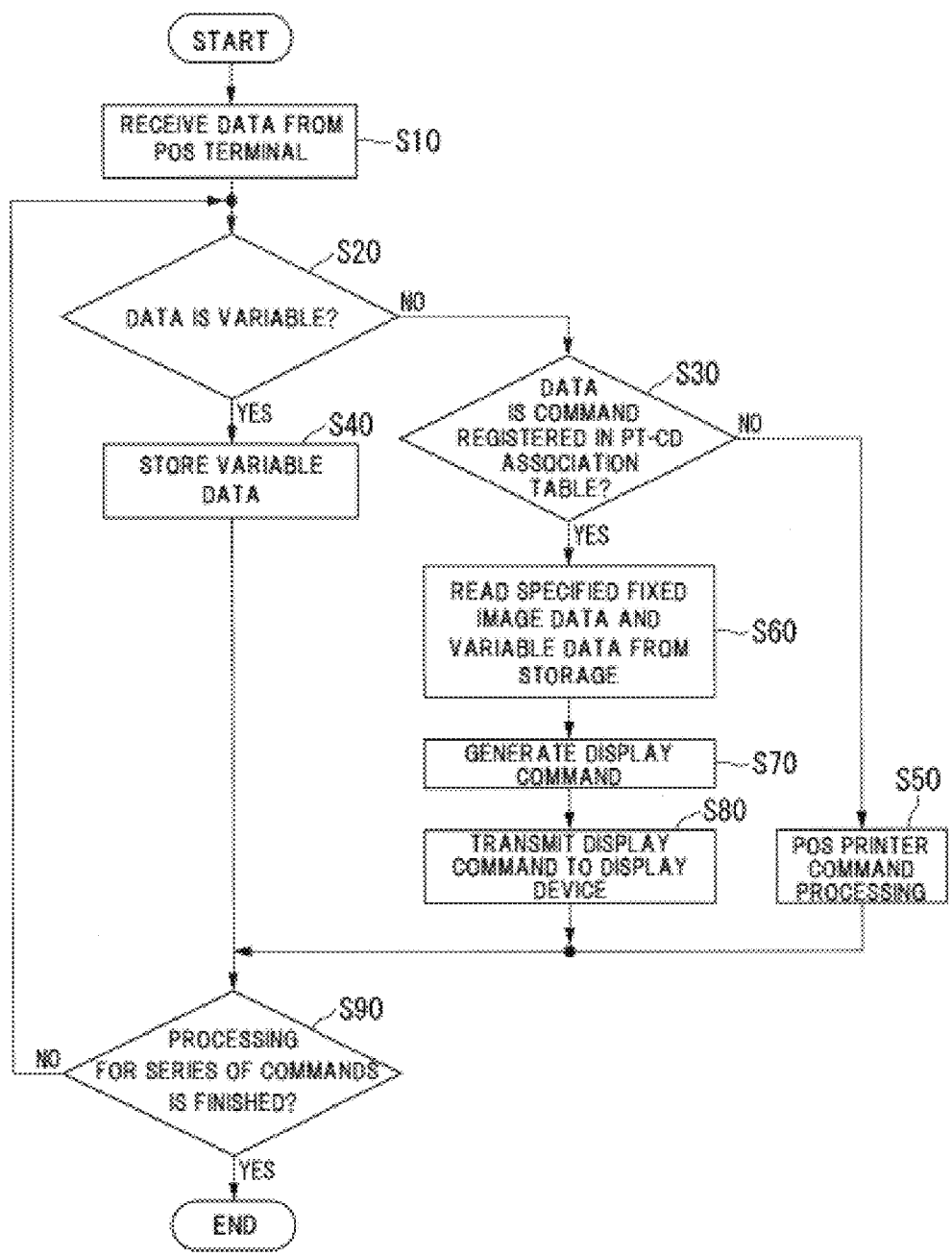
FIG. 7 is a diagram for illustrating an example of an operation of a printer device according to the first embodiment.

Next, a description is given of an example of an operation of the printer device 100 with reference to FIG. 7. FIG. 7 is a flowchart for illustrating an example of the operation of the printer device 100 according to the first embodiment. As described above, the POS terminal 200 transmits the command CMD and the variable data VD to the printer device 100. As described above, the command CMD contains a command for the printer and a command for the display device. Now, a description is given taking an exemplary case of the POS terminal 200 transmitting the command CMD and the variable data VD for printing of a receipt R1 illustrated in FIG. 8 and the command CMD and the variable data VD for displaying an image P1 illustrated in FIG. 9 on the display device 300 to the printer device 100.

Figure 8:
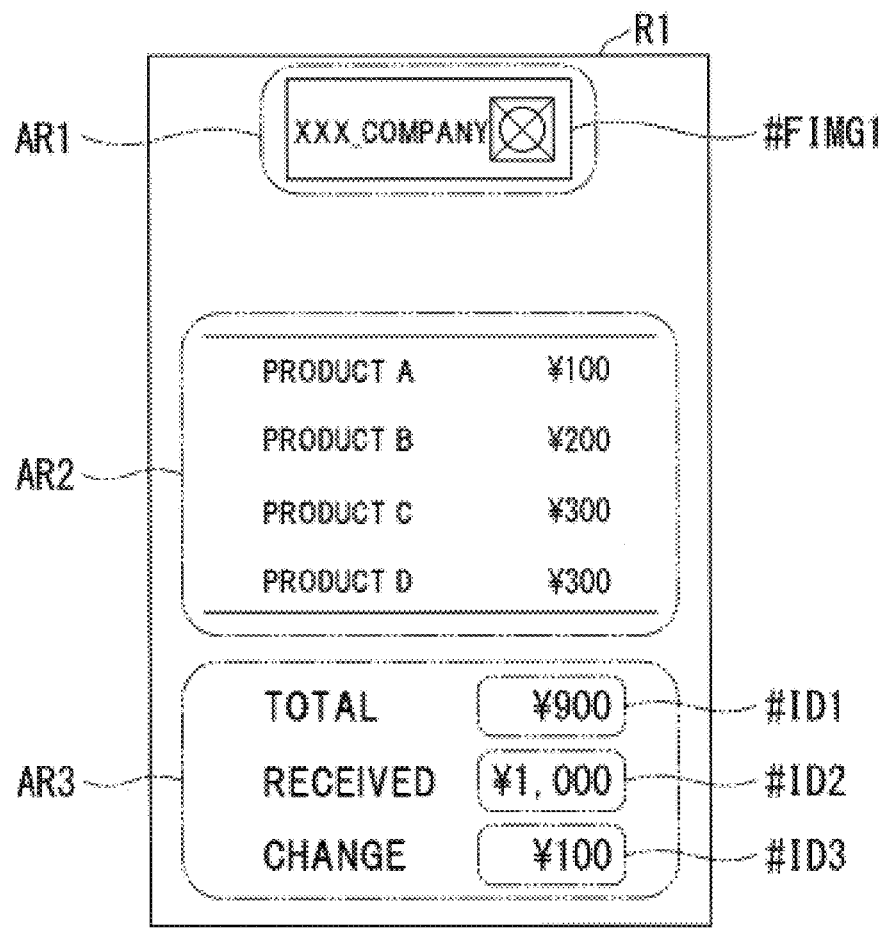
FIG. 8 is a diagram for illustrating an example of a result of printing by the printer device according to the first embodiment.

FIG. 8 is a diagram for illustrating an example of a result of printing by the printer device 100 according to the first embodiment. In this example, the receipt R1 includes a region AR1 on which a logo of a company that has sold the product is printed, a region AR2 on which the product name and price of the sold product are printed, and a region AR3 on which the total amount, the received amount, and the change amount are printed. The POS terminal 200 sequentially transmits to the printer device 100 the variable data VD and the command CMD for printing information on the region AR1 to the region AR3 of the receipt R1. In this example, regarding the region AR1, the POS terminal 200 transmits to the printer device 100 the command CMD for printing the fixed image data FIMG (namely, company logo data) of #FIMG 1 shown in FIG. 4 on the region AR1. Regarding the region AR2, the POS terminal 200 transmits to the printer device 100 the text data TXT indicating the product name and price of the sold product and the command CMD for printing the text data TXT on the region AR2. Regarding the region AR3, the POS terminal 200 transmits to the printer device 100 the text data TXT indicating the total amount, the received amount, and the change amount and the command CMD for printing the text data TXT on the region AR3.

Further, the POS terminal 200 transmits to the printer device 100 the command CMD for displaying, on the display device 300, a screen indicating the total amount, the received amount, and the change amount to be printed on the region AR3 of the receipt R1 described above.

Figure 9:
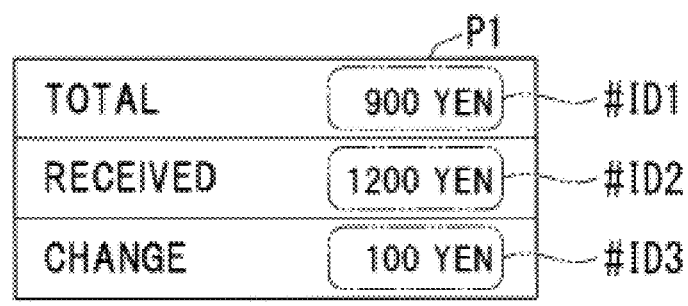
FIG. 9 is a diagram for illustrating an example of details to be displayed on a display device in the first embodiment.

FIG. 9 is a diagram for illustrating an example of details to be displayed on the display device 300 according to the first embodiment. In this example, the display of the display device 300 displays the image P1 indicating the total amount, the received amount, and the change amount. The POS terminal 200 transmits to the printer device 100 a command for the display device, which is used to display the total amount, the received amount, and the change amount on the display device 300. For example, the command code 1 (refer to FIG. 3) is assigned to the command for the display device. In the case of this example, the POS terminal 200 transmits the command for the display device containing the command code 1, the template number 1, and the identifiers #ID 1 to #ID 3 to the printer device 100. Referring back to FIG. 7, a description is given of the operation of the printer device 100 in this example.

(Step S10)

The wireless communication device 140 of the printer device 100 receives information from the POS terminal 200. The information received by the wireless communication device 140 contains the command CMD and the variable data VD.

The information sequentially transmitted to the printer device 100 from the POS terminal 200 is stored in the reception buffer of the wireless communication device 140 in order of reception thereof. The output destination selection module 111 reads the received information from the reception buffer of the wireless communication device 140, and interprets details of the received information in Step S20 and Step S30.

(Step S20)

The output destination selection module 111 determines whether the information read from the reception buffer is the variable data VD. When the output destination selection module 111 determines that the read information is the variable data VD (Step S20: YES), the output destination selection module 111 advances the processing to Step S40. When the output destination selection module 111 determines that the read information is not the variable data VD (Step S20: NO), the output destination selection module 111 advances the processing to Step S30.

(Step S30)

The output destination selection module 111 determines whether the information read from the reception buffer is a command for the printer or a command for the display device. In this example, the output destination selection module 111 determines that the read information is a command for the display device when the read information is the command CMD registered in the PT-CD association table TBL. Further, when the read information is not registered in the PT-CD association table TBL, the output destination selection module 111 determines that the read information is a command for the printer. When the read information is not registered in the PT-CD association table TBL (Step S30: NO), the output destination selection module 111 advances the processing to Step S50. When the read information is registered in the PT-CD association table TBL (Step S30: YES), the output destination selection module 111 advances the processing to Step S60. That is, in Step S20 and Step S30, the output destination selection module 111 determines the type of information read from the reception buffer to select the processing method.

(Step S40)

When the information read from the reception buffer is the variable data VD, the output destination selection module 111 stores the read variable data VD into the volatile storage 132. At this time, the POS terminal 200 assigns an identifier for individually identifying information to the variable data VD for transmission to the printer device 100. Specifically, when the variable data VD is the image data IMG, the POS terminal 200 assigns an identifier #IMG n (n is a natural number, which is the same in the following description) to the image data IMG for transmission. When the variable data VD is the text data TXT, the POS terminal 200 assigns an identifier #ID n to the text data TXT for transmission. When the read identifier of the variable data VD is #ID n, the output destination selection module 111 determines that the variable data VD is the text data TXT. Further, when the read identifier of the variable data VD is #IMG n, the output destination selection module 111 determines that the variable data VD is the image data IMG. When the read variable data VD is the image data IMG, the output destination selection module 111 stores the read image data IMG into the volatile storage 132 in association with the identifier #IMG n (refer to FIG. 5). When the read variable data VD is the text data TXT, the output destination selection module 111 stores the read image data IMG into the volatile storage 132 in association with the identifier #ID n (refer to FIG. 6).

In a specific example of the first embodiment, the POS terminal 200 assigns the identifier #ID 1 to "900 yen", the identifier #ID2 to "1,000 yen", and the identifier #ID 3 to "100 yen" for transmission to the printer device 100 as the text data TXT. The output destination selection module 111 stores combinations of the identifier #ID 1 and "900 yen", the identifier #ID2 and "1,000 yen", and the identifier #ID 3 and "100 yen", which are read from the reception buffer of the wireless communication device 140, into the volatile storage 132 as the text data TXT (refer to FIG. 6).

(Step S50)

The printer command processing module 112 interprets the command for the printer read from the reception buffer. Specifically, the command for the printer contains information for specifying details to be printed by the printer 160. The printer command processing module 112 reads information required for printing from the storage 130 based on the information contained in the command for the printer.

For example, when the receipt R1 illustrated in FIG. 8 is to be printed, the command for the printer contains information for specifying image information on, for example, the company logo or the image of the product, the number of the total amount, or the number of the received amount, or the number of the change amount. In this example, the printer device 100 prints the fixed image data FIMG (refer to FIG. 4) of the identifier #FIMG 1 on the region AR1 of the receipt R1 as the company logo. The printer device 100 prints the pieces of text data TXT (refer to FIG. 6) of the identifiers #ID 1 to #ID 3 on the region AR3 of the receipt R1 as the total amount, the received amount, and the change amount. Printing on the region AR2 is similar to that on the region AR3, and thus the description thereof is omitted here. In the case of this example, the command for the printer contains an instruction to print the fixed image data FIMG of the identifier #FIMG 1 on the region AR1, and an instruction to print the pieces of text data TXT of the identifiers #ID 1 to #ID 3 on the region AR3. At this time, the number of the total amount, the number of the received amount, and the number of the change amount are already stored in the volatile storage 132 in Step S40. Thus, the command for the printer processed in Step S50 does not contain the number of the total amount, the number of the received amount, or the number of the change amount.

The printer command processing module 112 reads the fixed image data FIMG of the identifier #FIMG 1 specified by the command for the printer from the non-volatile storage 131. Further, the printer command processing module 112 reads the pieces of text data TXT of the identifiers #ID 1 to #ID 3 specified by the command for the printer from the volatile storage 132. In Step S40 described above, the volatile storage 132 stores the combinations of the identifier #ID 1 and "900 yen", the identifier #ID2 and "1,000 yen", and the identifier #ID 3 and "100 yen" as the text data TXT (refer to FIG. 6). That is, in this case, the display information processing module 113 reads "900 yen", "1,000 yen", and "100 yen" from the volatile storage 132.

The printer command processing module 112 generates the printing data PD indicating that the read fixed image data FIMG (company logo in this example) is to be printed on the region AR1 and the read text data TXT ("900 yen", "1,000 yen", and "100 yen" in this example) is to be printed on the region AR3. The printer command processing module 112 outputs the generated printing data PD to the printer 160. The printer 160 prints information on a recording sheet based on the printing data PD.

(Step S60)

The display information processing module 113 interprets the command for the display device read from the reception buffer. Specifically, the command for the display device contains information for specifying details to be displayed on the display device 300. The display information processing module 113 reads information required for display from the storage 130 based on the information contained in the command for the display device.

The command for the display device contains a command code. This command code is information for specifying the type of an operation to be performed by the display device 300. For example, an operation for displaying the text data TXT is assigned to the command code 1. Further, an operation for displaying the image data IMG is assigned to the command code 2 (refer to FIG. 3). The display information processing module 113 generates the display command DC depending on the number of the command code.

For example, when the POS terminal 200 causes the display device 300 to display the total amount, the received amount, and the change amount, the POS terminal 200 transmits the command for the display device with "command code 1" to the printer device 100. The command for the display device with "command code 1" contains the identifiers #ID for specifying, for example, the number of the total amount, the number of the received amount, and the number of the change amount to be displayed on the display of the display device 300. In this example, the command for the display device contains the identifier #ID 1 for specifying the number of the total amount, the identifier #ID 2 for specifying the number of the received amount, and the identifier #ID 3 for specifying the number of the change amount. In this case, the number of the total amount, the number of the received amount, and the number of the change amount are already stored in the volatile storage 132 in Step S40. Therefore, the command for the display device to be processed in Step S60 does not contain the number of the total amount, the number of the received amount, or the number of the change amount.

Further, the command for the display device contains a template number for specifying the type of the template TPL. The template TPL is information for defining the layout of screen display on the display device 300. As described above, this template TPL is stored in advance in the display device storage 310 of the display device 300. An example of the template TPL is illustrated in FIG. 10.

FIG. 10 is a diagram for illustrating an example of the template TPL to be stored in the display device storage 310 in the first embodiment. In the template TPL, for example, the font type, the font size, the position of a character to be displayed at a fixed position (e.g., "total amount", "received amount", and "change amount"), and the position of a variable (e.g., number of amount) are defined in advance. This template TPL can be used to display, for example, the company logo, the product image, the total amount, the received amount, and the change amount in a display layout determined in advance without the printer device 100 transmitting layout information for specifying the display layout in detail (refer to FIG. 9).

The display information processing module 113 reads the pieces of text data TXT of the identifiers #ID 1 to #ID 3 specified by the command for the display device from the volatile storage 132. In Step S40 described above, the volatile storage 132 stores "900 yen" in association with the identifier #ID 1, "1,000 yen" in association with the identifier #ID 2, and "100 yen" in association with the identifier #ID 3 as the text data TXT (refer to FIG. 6). That is, in this case, the display information processing module 113 reads "900 yen", "1,000 yen", and "100 yen" from the volatile storage 132.

(Step S70)

Referring back to FIG. 7, the display information processing module 113 generates the display command DC based on the command for the display device. Specifically, the display information processing module 113 uses the text data TXT of the identifiers #ID 1 to #ID 3 read in Step S60 to generate the display command DC. An example of the display command DC is shown in Expression (1) given below.

$$\text{display(template=1,var\_1="900YEN",var\_2="1,000YEN",var\_3="100YEN",time=255);} \quad (1)$$

(Step S80)

The display information processing module 113 outputs the display command DC generated in Step S70 to the display communication device 150. The display communication device 150 transmits the display command DC generated by the display information processing module 113 to the display device 300. As a result, the display device 300 displays details that are based on the display command DC (refer to FIG. 9).

(Step S90)

The output destination selection module 111 determines whether the processing for a series of commands CMD is finished. The series of commands CMD herein refer to the commands CMD sequentially received from the POS terminal 200 in Step S10 and stored in the reception buffer. When the output destination selection module 111 determines that the processing for the series of commands CMD is not finished (Step S90: NO), the output destination selection module 111 returns the processing to Step S20. When the output destination selection module 111 determines that the processing for the series of commands CMD is finished (Step S90: YES), the output destination selection module 111 ends the processing and waits to receive the command CMD from the next POS terminal 200.

As described above, in the POS system 1 in the first embodiment, the display device 300 is not connected to the POS terminal 200 but to the printer device 100. Thus, when the display device 300 displays, for example, the total amount, the received amount, and the change amount, the POS terminal 200 outputs information for display to the display device 300 via the printer device 100. Further, when the printer device 100 prints, for example, a receipt, the POS terminal 200 outputs information for printing to the printer device 100.

At this time, details to be printed by the printer device 100 and details to be printed by the display device 300 may have common parts. For example, when the printer device 100 prints the total amount, the received amount, and the change amount at the time of purchase of the product on the receipt, the display device 300 may display the total amount, the received amount, and the change amount in synchronization with this printing timing.

In this case, when the POS terminal 200 outputs information to the printer device 100 and the display device 300 independently of each other, the POS terminal 200 outputs information common to printing and display over a plurality of times for printing and display. Meanwhile, when a method of communication between the POS terminal 200 and the printer device 100 is a communication method having a relatively slow information transmission speed (e.g., short-range communication as in the first embodiment), a period of time required for outputting information becomes relatively longer, and a period of time required for processing by the POS terminal 200 becomes relatively longer. In this case, there is a problem in that throughput of payment processing by the POS terminal 200 is degraded.

The printer device 100 according to the first embodiment includes the storage 130, and temporarily stores the variable data VD output by the POS terminal 200 in the storage 130. The printer device 100 generates the display command DC based on the variable data VD stored in the storage 130 based on an instruction from the POS terminal 200, and supplies the generated display command DC to the display device 300. Further, the printer device 100 generates the printing data PD based on the variable data VD stored in the storage 130 based on the instruction from the POS terminal 200, and causes the printer 160 to perform printing based on the generated printing data PD. In other words, when the printer device 100 uses the variable data VD common to details to be displayed by the display device 300 and details to be printed by the printer 160, the printer device 100 can use the variable data VD stored in the storage 130 for both printing and display. Therefore, with the printer device 100 according to the first embodiment, it is possible to print and display information without the POS terminal 200 outputting information to the printer device 100 and the display device 300 independently of each other. With such a configuration, the printer device 100 according to the first embodiment can reduce the amount of information transmitted/received through communication to/from the POS terminal 200, and thus it is possible to reduce the period of time required for processing by the POS terminal 200. Therefore, with the printer device 100, it is possible to perform the payment processing by the POS terminal 200 more efficiently.

Further, the printer device 100 according to the first embodiment stores the PT-CD association table TBL in the storage 130. The printer device 100 generates the display command DC for the display device 300 based on the PT-CD association table TBL. The display information processing module 113 of the printer device 100 converts the command CMD into the display command DC based on the PT-CD association table TBL stored in the storage 130, to thereby generate the display command DC. At this time, when the printer device 100 does not generate the display command DC by itself, the POS terminal 200 is required to transmit the display command DC corresponding to the display device 300. For example, the format of the display command DC may be different depending on the type of the display device 300. With the printer device 100 according to the first embodiment, the PT-CD association table TBL can absorb such a difference in format of the display command DC. Therefore, with the printer device 100 according to the first embodiment, it is possible to control various types of display devices 300 without changing the command CMD transmitted by the POS terminal 200.

Further, in the printer device 100 according to the first embodiment, the printer command processing module 112 (printing controller) generates the printing information (e.g., printing data PD) based on the output information (e.g., variable data VD) stored in the storage 130 and the information (e.g., fixed image data FIMG) stored in the non-volatile storage 131. At this time, when the printing data PD is generated by using only the variable data VD without using the fixed image data FIMG, the POS terminal 200 is required to transmit a large amount of information containing the image data IMG corresponding to the fixed image data FIMG to the printer device 100. The printer device 100 according to the first embodiment stores in advance information that is not changed so often (or not required to be changed), for example, company logo data, in the non-volatile storage 131 as the fixed image data FIMG. Thus, the POS terminal 200 may transmit the #FIMG n of the fixed image data FIMG stored in the non-volatile storage 131, and is not required to transmit the image data IMG corresponding to the fixed image data FIMG. Therefore, with the printer device 100 according to the first embodiment, the printer device 100 according to the first embodiment can reduce the amount of information transmitted/received through communication to/from the POS terminal 200, and thus can reduce the period of time required for processing by the POS terminal 200. Therefore, with the printer device 100, it is possible to perform the payment processing by the POS terminal 200 more efficiently.

Modification Example

A description has been given of an exemplary case of the POS terminal 200 issuing the receipt R1. In this modification example, a description is given of a case of the POS terminal 200 issuing a discount coupon R2 of a product with reference to FIG. 11 and FIG. 12.

Figure 11:
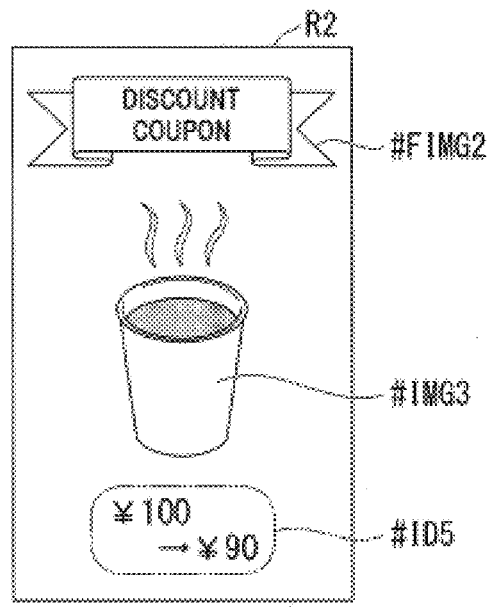
FIG. 11 is a diagram for illustrating an example of a discount coupon to be printed by the display device in the first embodiment.
Figure 12:
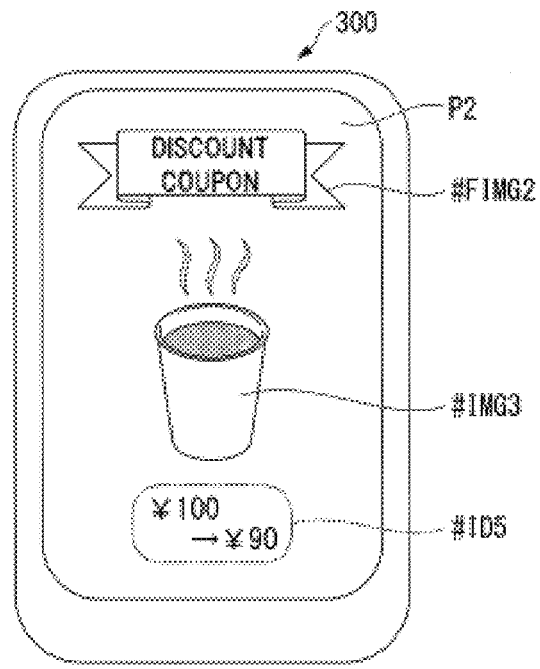
FIG. 12 is a diagram for illustrating an example of a discount coupon image to be displayed on the display device in the first embodiment.

FIG. 11 is a diagram for illustrating an example of the discount coupon R2 to be printed by the display device 100 in the first embodiment. FIG. 12 is a diagram for illustrating an example of the discount coupon image P2 to be displayed on the display device 300 in the first embodiment. In this example, the POS terminal 200 issues the discount coupon R2 of a product associated with a sold product. For example, when the sold product includes bread, the POS terminal 200 issues the discount coupon R2 of coffee as a product associated with the bread. The design (design of coffee in this example) of a product to be discounted is printed on the discount coupon R2. The fixed image data FIMG (e.g., identifier #FIMG 2) on the title of the discount coupon, the image data IMG (e.g., identifier #IMG 2) on coffee, which is a product to be discounted, and the text data TXT (e.g., identifier #ID 5) on the discount amount are printed on the discount coupon R2. Further, the fixed image data FIMG (e.g., identifier #FIMG 2) on the title of the discount coupon, the image data IMG (e.g., identifier #IMG 2) of coffee, which is a product to be discounted, and the text data TXT (e.g., identifier #ID 5) on the discount amount are displayed on the discount coupon image P2. That is, the common fixed image data FIMG, image data IMG, and text data TXT are used for the discount coupon R2 and the discount coupon image P2.

In other words, the information received by the wireless communication device 140 (receiver) contains the image data IMG (image data). When the product to be discounted is a product other than coffee, the design of the product to be discounted, which is printed on the discount coupon R2, is changed. Therefore, the POS terminal 200 transmits the image data IMG on the design of the product to the printer device 100 for each product to be discounted. Also in this example, similarly to the above-mentioned example, the printer device 100 stores the image data IMG and the text data TXT in the volatile storage 132 in advance so that the POS terminal 200 can print and display information by simply specifying the identifier #IMG n and the identifier #ID n. Therefore, with the printer device 100 according to the first embodiment, it is possible to print and display information without the POS terminal 200 outputting information to the printer device 100 and the display device 300 independently of each other. Further, in this modification example, the image data IMG (e.g., design of coffee) is used as the variable data VD. In general, the image data IMG has a larger amount of information than the text data TXT, and thus a period of time required for the POS terminal 200 to transmit the variable data VD to the printer device 100 is larger than a period of time required for transmitting the text data TXT. That is, the period of time required for transmitting the image data IMG is reduced more than that required for transmitting the text data TXT by the printer device 100 storing the variable data VD.

Therefore, the printer device 100 according to the first embodiment can further reduce the amount of information transmitted/received through communication to/from the POS terminal 200, and thus it is possible to further reduce the period of time required for processing by the POS terminal 200. Therefore, with the printer device 100, it is possible to perform the payment processing by the POS terminal 200 more efficiently.

Second Embodiment

Figure 13:
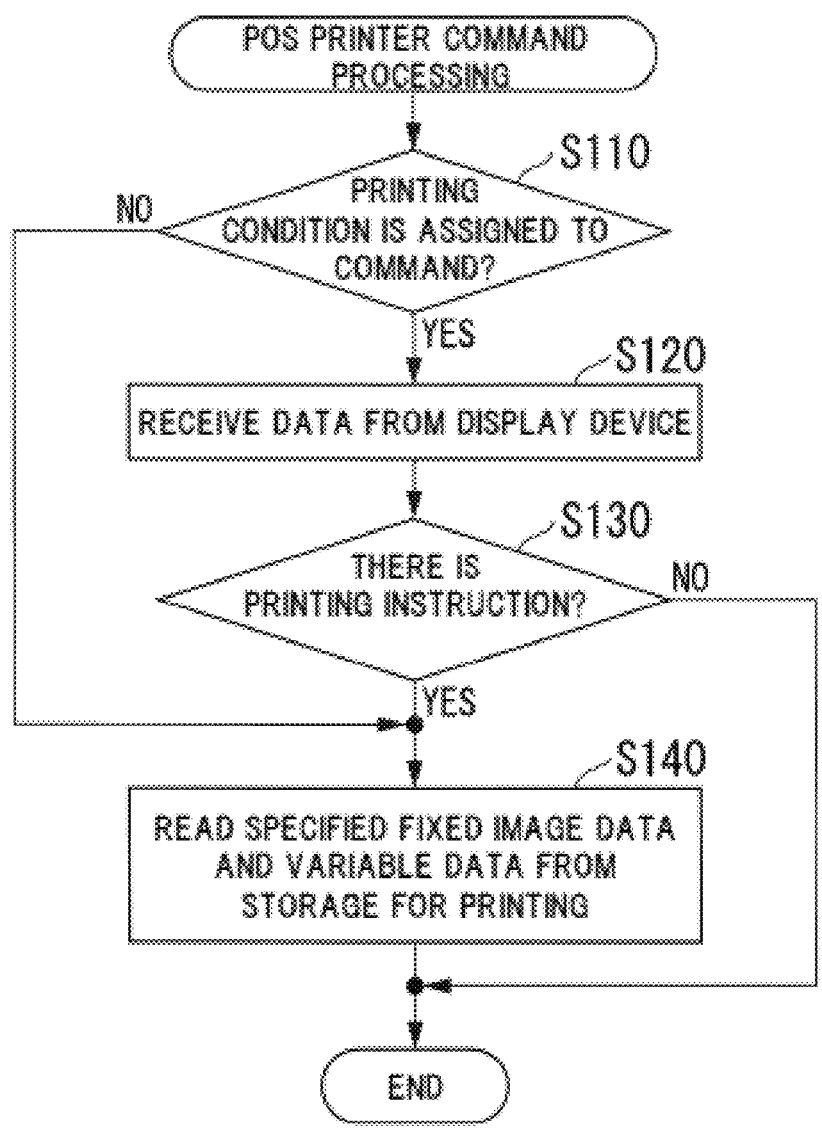
FIG. 13 is a flowchart for illustrating an example of an operation of the printer device according to a second embodiment of the present invention.
Figure 14:
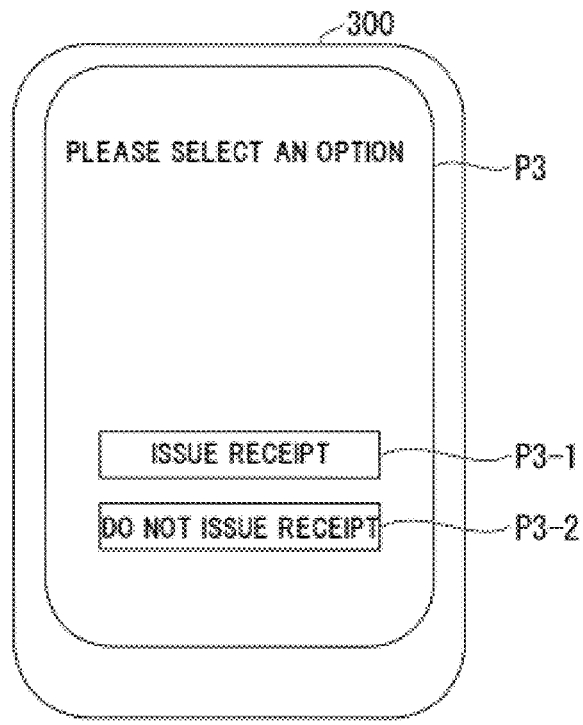
FIG. 14 is a diagram for illustrating an example of an operation image to be displayed on the display device in the second embodiment.

Next, with reference to FIG. 13 and FIG. 14, a description is given of the POS system 1 in a second embodiment of the present invention. The POS system 1 in the second embodiment is different from that in the first embodiment in that the POS system 1 can determine whether the printer device 100 is to perform printing based on a printing instruction from the display device 300. The configuration and operation similar to those in the first embodiment are assigned with the same reference symbol, and a description thereof is omitted here.

FIG. 13 is a flowchart for illustrating an example of an operation of the printer device 100 according to the second embodiment. Each step illustrated in FIG. 13 is executed in Step S50 illustrated in FIG. 2. That is, each step illustrated in FIG. 13 is executed under a state in which the variable data VD and the command CMD (command for printer) are received from the POS terminal 200 and the printer 160 is ready to perform printing based on information stored in the storage 130. In this example, a description is given on the assumption that the printer device 100 has received the variable data VD and the command CMD for printing the receipt R1 from the POS terminal 200.

The POS terminal 200 in the second embodiment can select whether to assign a printing condition to the command CMD (command for printer) to be transmitted to the printer device 100. Further, the display device 300 can transmit an instruction (e.g., printing execution command or printing non-execution command) indicating whether to perform printing to the printer device 100. The display communication device 150 of the printer device 100 can receive a printing execution command and a printing non-execution command from the display device 300.

(Step S110)

The printer command processing module 112 of the printer device 100 determines whether a printing condition is assigned to the command CMD received from the POS terminal 200. When the printer command processing module 112 determines that a printing condition is not assigned to the command CMD (Step S110: NO), the printer command processing module 112 advances the processing to Step S140. When the printer command processing module 112 determines that a printing condition is assigned to the command CMD (Step S110: YES), the printer command processing module 112 advances the processing to Step S120.

Now, a description is given of an operation image to be displayed on the display device 300 with reference to FIG. 14. FIG. 14 is a diagram for illustrating an example of an operation image to be displayed on the display device 300 in the second embodiment. In this example, the display device 300 includes a touch-panel display. The display device 300 displays an operation image (printing instruction image P3) for transmitting a printing instruction to the printer device 100. The printing instruction image P3 displays an operation button image P3-1 for displaying "Issue receipt" and an operation button image P3-2 for displaying "Do not issue receipt". When the image for displaying "Issue receipt" is operated, that is, the operation button image P3-1 is operated (for example, touched), the display device 300 transmits a printing execution command to the printer device 100. When the image for displaying "Do not issue receipt" is operated, that is, the operation button image P3-2 is operated (for example, touched), the display device 300 transmits a printing non-execution command to the printer device 100.

(Step S120)

The display communication device 150 receives the printing execution command or the printing non-execution command from the display device 300.

(Step S130)

The printer command processing module 112 determines whether the command received by the display communication device 150 from the display device 300 is a printing execution command or a printing non-execution command. When the command received from the display device 300 is a printing execution command, that is, when there is a printing instruction (Step S130: YES), the printer command processing module 112 advances the processing to Step S140. On the contrary, when the command received from the display device 300 is a printing non-execution command, that is, when there is no printing instruction (Step S130: NO), the printer command processing module 112 ends the processing.

When the printing non-execution command is received, the printer command processing module 112 may delete the variable data VD (image data IMG or text data TXT) stored in the volatile storage 132.

(Step S140)

The printer command processing module 112 prints the receipt R1 on a recording sheet similarly to the processing in Step S50 described above.

That is, the printer command processing module 112 (detector) detects a printing instruction to be received by the display communication device 150 from the display device 300 or a printing instruction (e.g., printing execution command or printing non-execution command) to an operation device included in the own printer device 100. Further, the printer command processing module 112 (printing controller) determines whether to output the printing data PD (printing information) to the printer 160 based on a result of detecting a printing instruction.

Through the configuration as described above, the printer device 100 can determine whether to perform printing based on an instruction from the display device 300. That is, the printer device 100 according to the second embodiment can determine whether to perform printing without intervention of the POS terminal 200. At this time, when the POS terminal 200 determines whether to perform printing, the POS terminal 200 is required to wait for an operation of determining whether to perform printing, and the processing efficiency of the POS terminal 200 may deteriorate. With the printer device 100 according to the second embodiment, it is possible to determine whether to perform printing without intervention of the POS terminal 200, and thus it is possible to save paper resources by preventing, for example, an unnecessary receipt from being issued without causing deterioration of the processing efficiency of the POS terminal 200. That is, with the printer device 100 according to the second embodiment, it is possible to perform the payment processing by the POS terminal 200 more efficiently while saving paper resources.

In the description given above, a description has been given of a case in which the printer device 100 determines whether to perform printing based on an instruction from the display device 300. However, the configuration is not limited thereto. The printer device 100 may determine whether to perform printing based on an instruction from a component other than the display device 300. For example, the printer device 100 may include a printing button (not shown). In this case, the printer device 100 may determine whether to perform printing based on an operation of the printing button instead of an instruction from the display device 300.

Third Embodiment

Figure 15:
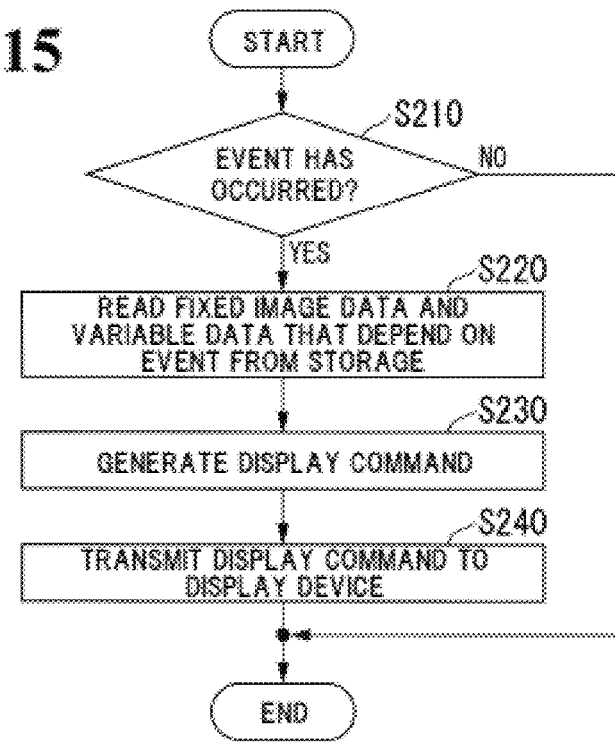
FIG. 15 is a flowchart for illustrating an example of an operation of the printer device according to a third embodiment of the present invention.
Figures 16, 17:
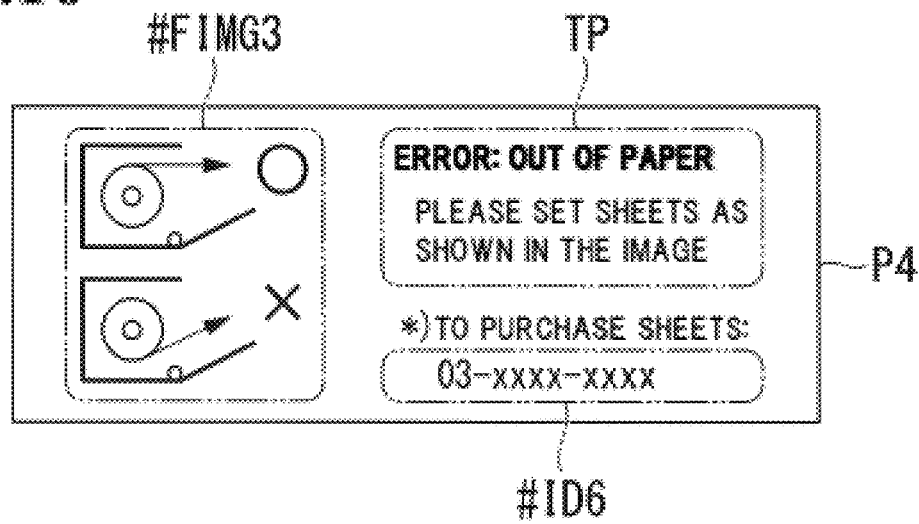
FIG. 16 is a diagram for illustrating an example of an event image to be displayed on the display device in the third embodiment.
FIG. 17 is a diagram for illustrating an example of the template to be stored in the display device storage in the third embodiment.

Next, a description is given of the POS system 1 in a third embodiment of the present invention with reference to FIG. 15 to FIG. 17. The POS system 1 in the third embodiment is different from that in each of the embodiments described above in that the printer device 100 generates the display command DC on condition that the printer device 100 has detected some event. The event includes, for example, the fact that a pairing mode for wireless communication between the printer device 100 and the POS terminal 200 has been entered or the fact that the sensor 120 of the printer 160 has detected "out of paper". The configuration and operations similar to those in each of the embodiments described above are assigned with the same reference numerals, and a description thereof is omitted here.

FIG. 15 is a diagram for illustrating an example of an operation of the printer device 100 according to the third embodiment. Each step illustrated in FIG. 15 is executed in parallel to each step illustrated in FIG. 2.

The printer device 100 can transition to the wireless communication pairing mode by, for example, an operation of a pairing button (not shown) or an operation of a touch panel of the display device 300. The wireless communication pairing mode is an operation mode of the initial setting, for example, authentication of a paired device, in wireless communication between the printer device 100 and the POS terminal 200. In this wireless communication pairing mode, authentication information (e.g., two-dimensional code) on the printer device 100 is displayed on the display device 300, and the authentication information displayed on the display device 300 is photographed by a camera (not shown) included in the POS terminal 200, to thereby cause the POS terminal 200 to authenticate the printer device 100. In an example of the third embodiment, the two-dimensional code for authentication of the printer device 100 is stored in advance in the non-volatile storage 131 of the printer device 100 as the fixed image data FIMG.

(Step S210)

The display information processing module 113 of the printer device 100 determines whether the mode is the wireless communication pairing mode (that is, whether event has occurred). When the display information processing module 113 determines that the mode is not the wireless communication pairing mode (Step S210: NO), the display information processing module 113 ends the processing. When the display information processing module 113 determines that the mode is not the wireless communication pairing mode (Step S210: YES), the display information processing module 113 advances the processing to Step S220.

(Step S220)

The display information processing module 113 reads information (e.g., fixed image data FIMG on two-dimensional code for authentication of printer device 100) to be displayed on the display device 300 in the wireless communication pairing mode from the non-volatile storage 131.

(Step S230)

The display information processing module 113 generates the display command DC by using the read fixed image data FIMG on the two-dimensional code for authentication of the printer device 100.

(Step S240)

The display information processing module 113 outputs the display command DC generated in Step S230 to the display communication device 150. The display communication device 150 transmits the display command DC generated by the display information processing module 113 to the display device 300. As a result, the display device 300 displays the two-dimensional code for authentication of the printer device 100.

In an example of the third embodiment, a description has been given on the assumption that the two-dimensional code for authentication of the printer device 100 is stored in advance in the non-volatile storage 131 of the printer device 100 as the fixed image data FIMG. However, the configuration is not limited thereto. For example, the display device 300 may generate the two-dimensional code for authentication of the printer device 100. In this case, the printer device 100 transmits information (e.g., character code) for generating the two-dimensional code for authentication to the display device 300. The display device 300 generates the two-dimensional code based on information, for example, a character code transmitted by the printer device 100. The display device 300 displays the generated two-dimensional code as the two-dimensional code for authentication of the printer device 100. With such a configuration, it is possible to further reduce the information amount of communication between the printer device 100 and the display device 300 compared to the case of the printer device 100 transmitting the fixed image data FIMG on the two-dimensional code for authentication. Further, with such a configuration, the display device 300 can generate the two-dimensional code for authentication of a size that suits the resolution or number of pixels of the display. Thus, even when the resolution or number of pixels of the display is different for each type of the display device 300, the printer device 100 can use the common display command DC for transmission to the display device 300.

When the sensor 120 has detected "out of paper", the printer device 100 displays an image P4 for prompting supply of a recording sheet on the display device 300. An example of the image P4 for prompting supply of a recording sheet is illustrated in FIG. 16.

FIG. 16 is a diagram for illustrating an example of an event image to be displayed on the display device 300 in the third embodiment. The image P4 for prompting supply of a recording sheet contains an image (identifier #FIMG 3) describing a method of supplying a recording sheet, a character string TP describing the method of supplying a recording sheet, and an image (identifier #ID6) describing contact information for purchasing a recording sheet. In this example, the image (identifier #FIMG 3) describing the method of supplying a recording sheet is stored in the non-volatile storage 131 of the printer device 100 as the fixed image data FIMG. The character string (e.g., phone number) describing the contact information for purchasing a recording sheet is stored in the volatile storage 132 of the printer device 100 as the text data TXT. In this case, the contact information for purchasing a recording sheet is stored in the printer device 100 as the variable data VD, and thus the POS terminal 200 can be used to update the address. Further, the character string TP describing the method of supplying a recording sheet is stored in the display device storage 310 of the display device 300 as the template TPL. An example of the template TPL is illustrated in FIG. 17.

FIG. 17 is a diagram for illustrating an example of the template TPL to be stored in the display device storage 310 in the third embodiment. The template TPL contains layout information on the image P4 for prompting supply of a recording sheet. The template TPL can be used to display the image P4 for prompting supply of a recording sheet in a display layout determined in advance without the printer device 100 transmitting layout information for specifying the display layout in detail to the display device 300. Referring back to FIG. 15, a description is given of an example of the operation of the printer device 100 in a case where the sensor 120 has detected "out of paper".

(Step S210)

The display information processing module 113 of the printer device 100 determines whether the sensor 120 has detected "out of paper" (that is, whether event has occurred). When the display information processing module 113 has determined that the sensor 120 has not detected "out of paper" (that is, detected that there is recording sheet) (Step S210: NO), the display information processing module 113 ends the processing. When the display information processing module 113 has determined that the sensor 120 has detected "out of paper" (Step S210: YES), the display information processing module 113 advances the processing to Step S220.

(Step S220)

The display information processing module 113 reads, from the storage 130, information to be displayed on the display device 300 in a case of detection of "out of paper". The information to be displayed on the display device 300 in the case of detection of "out of paper" contains the fixed image data FIMG on "image (identifier #FIMG 3) describing the method of supplying a recording sheet" stored in the non-volatile storage 131, the template TPL number stored in the non-volatile storage 131, and the "character string (identifier #ID 6) indicating the contact information for purchasing a recording sheet" stored in the volatile storage 132. The display information processing module 113 reads each piece of information from the storage 130.

(Step S230)

The display information processing module 113 uses the fixed image data FIMG, the number of the template TPL, and the text data TXT to generate the display command DC.

(Step S240)

The display information processing module 113 outputs the display command DC generated in Step S230 to the display communication device 150. The display communication device 150 transmits the display command DC generated by the display information processing module 113 to the display device 300. As a result, the display device 300 displays the image P4 for prompting supply of a recording sheet.

As described above, with the printer device 100 according to the third embodiment, the information (e.g., wireless communication pairing information) to be displayed on the display device 300 when communication to/from the POS terminal 200 is disabled can be displayed on the display device 300 irrespective of an instruction given by the POS terminal 200. Further, with the printer device 100 according to the third embodiment, an event that has occurred inside the printer device 100 can be displayed on the display device 300 irrespective of an instruction by the POS terminal 200. That is, the printer device 100 according to the third embodiment can control display of the display device 300 without intervention of the POS terminal 200. Thus, with the printer device 100 according to the third embodiment, it is possible to further reduce the period of time required for processing by the POS terminal 200. Therefore, with the printer device 100, it is possible to perform the payment processing by the POS terminal 200 more efficiently.

In the example of the above-mentioned embodiments, a description has been given on the assumption that the variable data VD is stored in the volatile storage 132. However, the configuration is not limited thereto. The variable data VD may temporarily be stored in the storage 130 after reception by the wireless communication device 140, and for example, may be stored in the non-volatile storage 131.

Although the embodiments of the present invention have been described in detail with reference to the drawings, the specific configurations are not limited to those of the embodiments, and the present invention can be appropriately changed without departing from the gist of the present invention.

Each of the above-mentioned devices has a computer therein. At this time, the above-mentioned processing step of each device is stored in a form of a program in a computer-readable storage medium, and the above-mentioned processing is performed by reading and executing the program by a computer. The "computer-readable storage medium" as used herein refers to a magnetic disk, a magneto-optical disk, a CD-ROM, a DVD-ROM, or a semiconductor memory, for example. Moreover, the computer program may be distributed to the computer through a communication line, and the computer that has received the distributed program may execute the program.

Further, the program described above may be a program that implements some of the functions described above. The functions described above may be implemented by what is called a differential file (a differential program), which is used in combination with a program already recorded in the computer system.

What is claimed is:

1. A printer device, comprising:
    a receiver configured to receive pieces of information from a host device;
    a storage configured to store output information among the pieces of information received by the receiver;
    a printer configured to print information on a sheet based on printing information;
    a display communication device configured to transmit display information to a display device;
    an output destination selection module configured to select an output destination of the output information stored in the storage based on instruction information among the pieces of information received by the receiver from the host device;
    a display information generation module configured to generate, when the output destination selected by the output destination selection module is the display device, the display information based on the output information stored in the storage; and
    a printing controller configured to output, when the output destination selected by the output destination selection module is the printer, the printing information that is based on the output information stored in the storage, to the printer,
    wherein the display communication device configured to output the display information generated by the display information generation module to the display device.

2. A printer device according to claim 1,
    wherein the storage is configured to store an association table, which associates a type of the instruction information with a type of the display information, and
    wherein the display information generation module is configured to generate the display information by converting the instruction information to the display information based on the association table stored in the storage.

3. A printer device according to claim 2, wherein the information received by the receiver contains image data.

4. A printer device according to claim 3, further comprising a non-volatile storage configured to hold information stored therein irrespective of whether power is supplied to the non-volatile storage,
    wherein the printing controller is configured to generate the printing information based on the output information stored in the storage and the information stored in the non-volatile storage.

5. A printer device according to claim 4, further comprising a detector configured to perform one of detecting a printing instruction to be received by the display communication device from the display device and detecting a printing instruction operation for an operation device included in the own printer device,
    wherein the printing controller is configured to determine whether to output the printing information to the printer based on a result of detection by the detector.

6. A printer device according to claim 1, wherein the information received by the receiver contains image data.

7. A printer device according to claim 1, further comprising a non-volatile storage configured to hold information stored therein irrespective of whether power is supplied to the non-volatile storage,
    wherein the printing controller is configured to generate the printing information based on the output information stored in the storage and the information stored in the non-volatile storage.

8. A printer device according to claim 1, further comprising a detector configured to perform one of detecting a printing instruction to be received by the display communication device from the display device and detecting a printing instruction operation for an operation device included in the own printer device,
    wherein the printing is configured to determine whether to output the printing information to the printer based on a result of detection by the detector.

* * * * *

UNITED STATES PATENT AND TRADEMARK OFFICE
CERTIFICATE OF CORRECTION

PATENT NO. : 10,510,059 B2  
APPLICATION NO. : 16/218788  
DATED : December 17, 2019  
INVENTOR(S) : Takanori Okayasu Page 1 of 1

It is certified that error appears in the above-identified patent and that said Letters Patent is hereby corrected as shown below:

In the Claims

In Column 20, Claim 8, Line 36, insert --controller-- between "printing" and "is".

Signed and Sealed this  
Thirty-first Day of March, 2020

Andrei Iancu  
*Director of the United States Patent and Trademark Office*